Sept. 6, 1927.  T. W. ADAIR  1,641,467

FLEXIBLE PIPE ENGAGING SLIP

Filed Feb. 16, 1926  2 Sheets-Sheet 1

T. W. Adair  Inventor

By Jesse R. Stone

Attorney

Sept. 6, 1927. 1,641,467
T. W. ADAIR
FLEXIBLE PIPE ENGAGING SLIP
Filed Feb. 16, 1926 2 Sheets-Sheet 2

T.W.Adair Inventor

By Jesse R. Stone
Attorney

Patented Sept. 6, 1927.

1,641,467

UNITED STATES PATENT OFFICE.

THOMAS W. ADAIR, OF HOUSTON, TEXAS.

FLEXIBLE PIPE-ENGAGING SLIP.

Application filed February 16, 1926. Serial No. 88,674.

My invention relates to pipe engaging slips to be employed particularly in holding and supporting pipe in wells.

The device may be employed in supporting casing drill stem or pump tubing, but it finds its most valuable use in holding the drill stem while it is being raised from or inserted into the well. For most convenient and rapid operation, it is desired to use but two slips in holding the pipe. When but two slips are employed, however, the rigid body of the tool does not allow of the firm contact of the teeth of the slip upon the pipe except at the central line of each jaw. To make the slips flexible, various multiple jaw slips have been devised which are successful in more firmly gripping the pipe, but it is my object to avoid the use of more than one jaw upon each slip.

The principal object is, therefore, to provide a pipe holding means which employs but two gripping jaws, each of which is separately movable, and the pipe engaging portion of which is flexible so as to firmly engage the pipe on all sides thereof.

Another object is to make the gripping surface removable and replaceable when worn. It is also desired that the device be light in weight and strong and durable in construction.

Further objects and advantages residing in the particular construction and arrangement of parts will more clearly appear from the more detailed description which follows.

Figure 1:
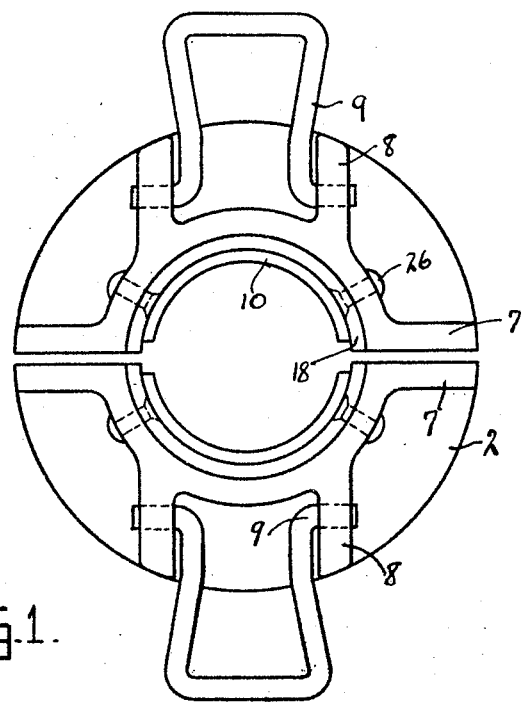
Figure 3:
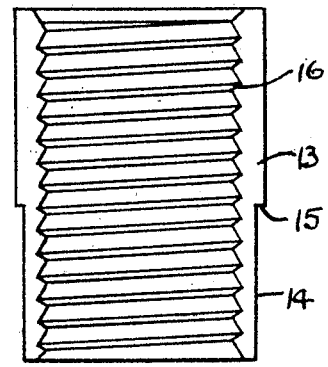
Figure 2:
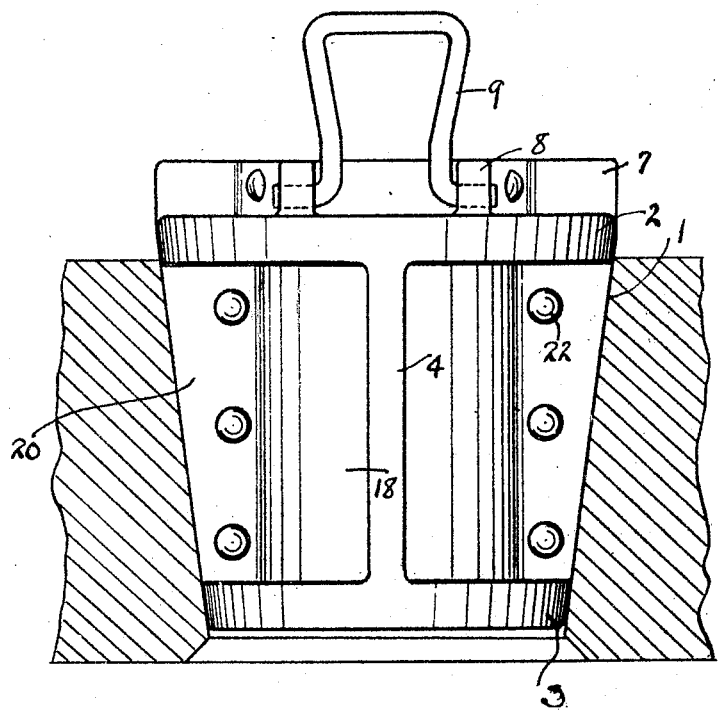
Figure 4:
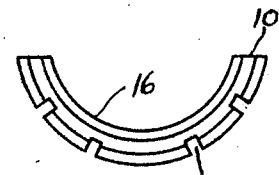
Figure 5:
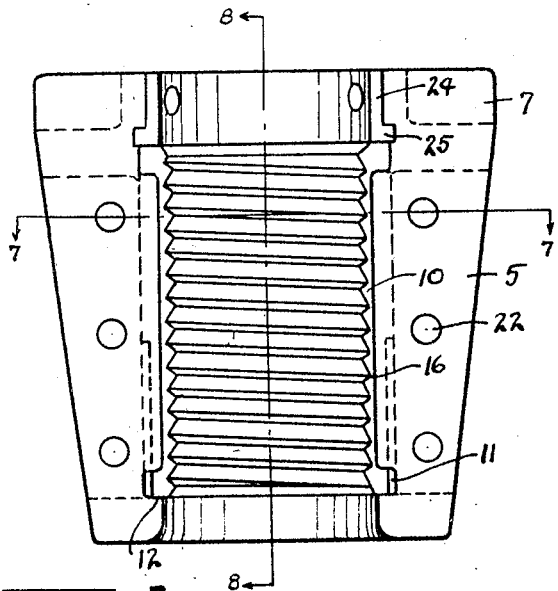
Figure 6:
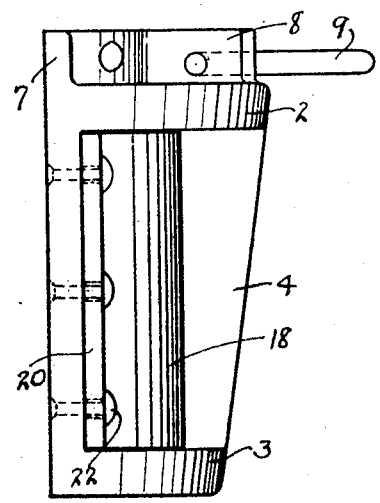
Figure 7:
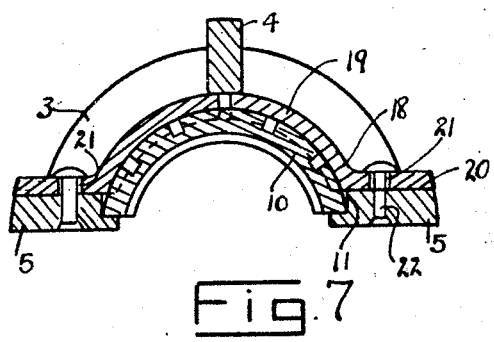
Figure 8:
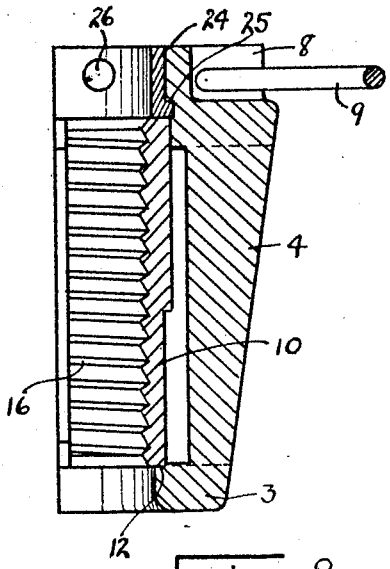
Figure 9:
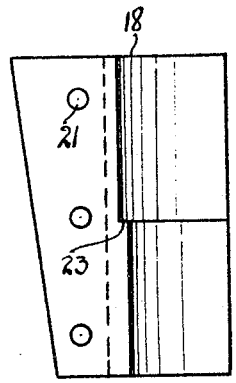

Referring to the drawing herewith, Fig. 1 is a top plan view of the two slips employed in gripping the pipe. Fig. 2 is a side elevation of a slip showing its position in the tapered seat of the rotary. Fig. 3 is a front elevation, and Fig. 4 a top plan view of the flexible jaw employed with my slip. Fig. 5 is a front elevation of the slip with the flexible jaw therein. Fig. 6 is a side elevation of the slip taken at right angles to the view shown in Fig. 5. Fig. 7 is a transverse section taken on the plane 7—7 of Fig. 5. Fig. 8 is a vertical section taken on the plane 8—8 of Fig. 5. Fig. 9 is a front elevation of one of the movable wedges employed with the slip. Like numerals of reference refer to like parts in all the views.

My slip is adapted to operate in combination with a tapered seat, indicated at 1 in Fig. 2. This tapered seat is usually formed in a spider fitting within the central opening in the table of the rotary when used for drilling purposes but may be applied to the casing head of the well when used in supporting tubing.

The slips which I employ comprise a skeleton frame work of steel, the outer face of which is tapered downwardly to fit within the seat 1 of the rotary. This frame comprises an upper plate 2 and a lower plate 3, arcuate in shape, tapered as previously stated to fit the seat 1. These two plates are connected centrally thereof by an upright web 4. Two additional upright webs 5 are provided at each end of the two plates, 2 and 3, and it is to be noted that the three webs, 4 and 5, 5, are also tapered downwardly. The inner sides of the plates and the webs are vertical to provide a surface parallel with the pipe which is to be gripped. Above the plate 2 of each slip there is a marginal web 7 on each slip and two spaced webs 8 midway between the edges of the slip. The two central webs 8 are provided with opposite openings therein to receive the handle 9, as will be clear from Figs. 1 and 2.

An inner removable jaw or gripping face 10 is provided on each slip. A recess 11 in each of the webs 5 is formed on the inner face of the web to form a slideway into which the jaw 10 may be fitted. The lower web 3 is extended inwardly a sufficient distance to form a shoulder 12 to limit the downward movement of the said jaw. The construction of the jaw is shown best in Figs. 3 and 4. It is cylindrical on its outer face, the upper portion 13, however, being slightly thicker than the lower portion 14 so that a shoulder 15 may be formed approximately midway between the ends thereof on the outer face, the purpose of which shoulder will presently appear. The inner face of the jaw is formed with the teeth 16, which are preferably inclined or spiral, after the manner of a screw thread, and it is contemplated that the teeth on one of the slips will be spiral to form a right-hand thread and the teeth of the opposite jaw will be formed with a left-hand spiral. The teeth are inclined slightly upward so as to better grip the pipe and prevent its dropping. The fact that the teeth of the jaws are spiral in opposite directions will tend to prevent rotation of a pipe which is being gripped. It is desired to form the gripping jaw 10 of flexible steel, but where the jaw is necessarily thick because of the large size of the jaw, it is contemplated that kerfs 17 may be cut vertically in the outer side of the jaw so as to allow it to be more flexible than it would otherwise be and allow it to conform to the curvature of the pipe.

It is desired that the jaw 10 be bent or flexed to conform to the pipe which is to be gripped, and this function is performed in my device by means of wedge sections 18 These sections have an inner arcuate plate 19 thereon extending from a point adjacent the center of the slip around to the outer web 5 and are then extended outwardly along the outer face of the web, as shown best in Fig. 7. The outer edge 20 of the wedge extends slightly beyond the web 5 so as to bear against the inner wall of the seat 1 when the slip is in use. These wedges are somewhat shorter than the jaw and fit between the lower surface of the upper plate 2 and the upper surface of the lower plate 3. They are slidable toward and away from the pipe to a limited degree. This sliding allowed through the formation of an opening 21 in the outer side of the wedge where it is attached to the web 5. Rivets 22 extend through the openings 21 and webs 5, said openings being larger than the rivets to allow play of said wedges. The wedges 18 are thereby slidable to and from the pipe in an obvious manner. The inner face of each of the wedge sections is formed with a shoulder 23 midway between the ends to receive the shoulder 15 on the flexible jaw. This allows the wedge portion to take up some of the weight of the pipe when the same is being gripped by the jaw, as will be obvious.

The jaw may be taken from or insertetd into the frame of the slip and when in position it may be secured against removal by means of a locking plate 24 which has a lower flange 25 fitting within a groove in the upper margin of the frame work. This plate is held in position by rivets 26 which may be removed with a chisel when necessary to renew the jaw 10.

In the operation of my device, the jaws will be fitted about the pipe within the seat 1, and, as the weight of the pipe is exerted upon the jaws they will be forced downwardly in the tapered seat 1 and the pressure of the wedge sections 18 against the inner face of the seat will cause the wedge sections to be forced inwardly toward the opposite sides of the jaw so that the jaw will be flexed inwardly and forced against the pipe throughout its entire width, thereby making a firm gripping contact of the teeth against the pipe at all points. It will be noted that the slip may be made light in construction so that it may be most easily handled and that the parts may be renewed when necessary. There is, however, an attempt made to minimize the number of parts necessary in the construction of the device so that it will be cheap to manufacture and easy to handle. The further advantages of the device will be obvious to those skilled in the art. What I claim as new and desire to protect by Letters Patent is:

1. The combination with a downwardly tapered seat of a pair of slips, each comprising a frame tapered on its outer side to fit said seat, a resilient jaw removably fitted within said frame, means to hold said jaw in position, wedge sections fitting slidably on said frame and bearing against the sides of said jaw, the outer ends of said wedge sections projecting outwardly to bear against the inner face of said seat to wedge the sides of said jaw inwardly in the manner described.

2. The combination of the downwardly tapered seat of a pair of slips, each comprising a frame tapered on its outer side to fit said seat, a resilient jaw fitting within said frame work, wedge members on said frame and bearing against said jaw, said wedge members being adapted to fit against said seat and be forced inwardly against said jaw, and means to handle said slips.

3. The combination with a downwardly tapered seat of a plurality of slips each comprising a frame work tapered on its outer side to fit said seat, a resilient gripping jaw on said slip, and means co-operating with said seat to force said jaw inwardly at its sides to seize the work.

4. The combination with a downwardly tapered seat of a pair of pipe engaging slips tapered to fit said seat, a flexible pipe gripping jaw mounted in each of said slips, wedge members bearing against said jaw and secured loosely to said slips, said wedge members being adapted to be forced inwardly by said seat in operation.

5. A pipe engaging slip comprising an arcuate frame tapered downwardly on its outer side, a flexible pipe engaging jaw on its inner face, and wedge members projecting slightly outward from said frame and bearing against said flexible jaw for the purpose described.

6. A pipe engaging slip of the character described comprising an arcuate frame tapered downwardly on its outer face to fit a tapered rotary spider, a flexible inner jaw on said slip mounted to permit its being bent transversely to grip the pipe at all points, and means in said frame to force said jaw into contact with the work during operation.

7. A pipe engaging slip comprising an arcuate frame tapered downwardly on its outer face, wedge members mounted loosely in said frame to be forced inwardly relative to said frame, said wedge members having an upwardly presented shoulder thereon, a toothed flexible jaw in said frame bearing against said frame and said wedge members, said jaw having a shoulder fitting on the shoulder of said wedge members for the purpose described.

8. In a pipe engaging slip of the character described, a single flexible pipe gripping jaw adapted to be bent transversely, and means on said slip to bend said jaw into conformance with the shape of the pipe and force said jaw into engagement with the pipe during operation.

9. In a pipe engaging slip of the character described a single toothed pipe gripping member, adapted to be bent transversely, and means at each side thereof to force it into pipe engaging position.

In testimony whereof I hereunto affix my signature this 4th day of February, A. D. 1926.

THOMAS W. ADAIR.